United States Patent
Gittins et al.

(10) Patent No.: US 6,904,547 B2
(45) Date of Patent: Jun. 7, 2005

(54) METHOD AND APPARATUS FOR FACILITATING VALIDATION OF DATA RETRIEVED FROM DISK

(75) Inventors: Robert S. Gittins, Westminster, CO (US); Richard S. Brown, Frankfort, IL (US)

(73) Assignee: Sun Microsystems, Inc, Santa Clara, CA (US)

(*) Notice: Subject to any disclaimer, the term of this patent is extended or adjusted under 35 U.S.C. 154(b) by 594 days.

(21) Appl. No.: 10/039,417

(22) Filed: Jan. 4, 2002

(65) Prior Publication Data

US 2003/0131280 A1 Jul. 10, 2003

(51) Int. Cl.[7] ............................................. G06F 11/00
(52) U.S. Cl. ................................... 714/54; 714/718
(58) Field of Search .............................. 714/54, 42, 5, 714/718, 724, 770, 807, 808, 819, 725

(56) References Cited

U.S. PATENT DOCUMENTS

| | | | | |
|---|---|---|---|---|
| 6,061,822 A | * | 5/2000 | Meyer | 714/758 |
| 6,092,229 A | * | 7/2000 | Boyle et al. | 714/748 |
| 6,098,194 A | * | 8/2000 | Rinne et al. | 714/807 |
| 6,324,661 B1 | * | 11/2001 | Gerbault et al. | 714/718 |
| 6,643,821 B2 | * | 11/2003 | Karim et al. | 714/801 |
| 2002/0162076 A1 | * | 10/2002 | Talagala et al. | 714/819 |
| 2003/0167439 A1 | * | 9/2003 | Talagala et al. | 714/770 |

* cited by examiner

Primary Examiner—Dieu-Minh Le
(74) Attorney, Agent, or Firm—Park, Vaughan & Fleming LLP

(57) ABSTRACT

One embodiment of the present invention provides a system that facilitates validation of data retrieved from a secondary storage device. The system operates by receiving a write request to write new data to a block of the secondary storage device, and calculating a new checksum value from the new data. The system also retrieves a current checksum value and an old checksum value associated with the block of the secondary storage device. Next, the system performs a checksum write operation to a validation device to update the current checksum value and the old checksum value, and then performs a data write operation to the secondary storage device to write the new data to the block of the secondary storage device.

28 Claims, 2 Drawing Sheets

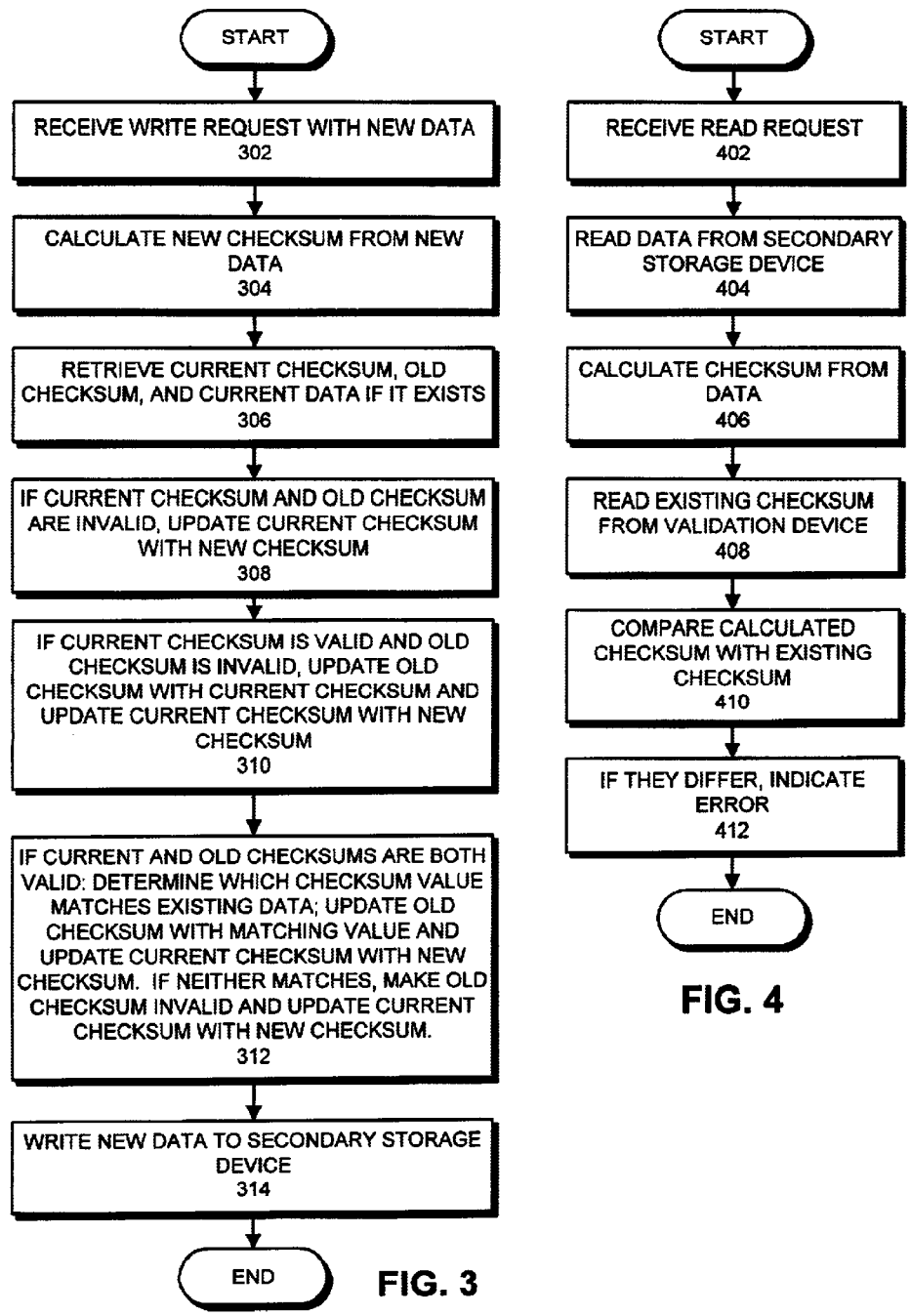

METHOD AND APPARATUS FOR FACILITATING VALIDATION OF DATA RETRIEVED FROM DISK

BACKGROUND

1. Field of the Invention

The present invention relates to the use of secondary storage devices, such as disk drives, in computer systems. More specifically, the present invention relates to a method and an apparatus for facilitating validation of data retrieved from a secondary storage device to ensure that data retrieved from the secondary storage device matches data that was originally stored to secondary storage.

2. Related Art

Advances in disk drive technology have dramatically increased the amount of data that can be stored on disk and have increased the rate at which data can be transferred to and from a disk. As data is packed more densely on disk drives and is transferred at faster rates, it becomes increasingly more likely for errors to occur. Hence, there is an increasing need to confirm the integrity of data retrieved from a disk to ensure that it is the same as data that was originally stored on the disk.

In order to confirm data integrity, computer system often compute a checksum, which is a function of a block of data to be stored on a disk drive. This checksum is stored along with the block of data on the disk drive. When the block of data is later retrieved from the disk, a new checksum is computed from the retrieved data and this new checksum is compared with the checksum that was stored with the data. If these checksums match, there is an extremely high probability that the data has not changed from its original value. If the checksums do not match, either the data or the checksum has changed.

One problem in using checksums is that the checksums require additional storage space on the disk drive. Hence, in order to store checksums along with disk blocks, the size of the disk blocks must be increased. For example, the size of a disk sector may have to be increased from 512 bytes to 516 bytes to accommodate four additional bytes of checksum information. This method works well. However, it requires the disk to be specially formatted to accommodate the checksums. Hence, it is not possible to add checksums to existing data stored on a normally formatted disk drive because the size increase causes the data to no longer fit in the original disk sector. Furthermore, when adding checksums to existing data, it is undesirable to dump out and restore the existing data in order to accommodate a new disk block format that includes space for checksum information.

It is possible to store the checksum data to another disk drive. However, if a system failure occurs during a write operation, there is no way of telling whether both the data and the checksum were written. If a system failure causes the checksum and the data to get out-of-synch, a false negative can be generated, which causes an error to be reported on good data.

What is needed is a method and an apparatus for providing validation information for disk blocks without the above-described problems.

SUMMARY

One embodiment of the present invention provides a system that facilitates validation of data retrieved from a secondary storage device. The system operates by receiving a write request to write new data to a block of the secondary storage device, and then calculating a new checksum value from the new data. The system also retrieves a current checksum value and an old checksum value associated with the block of the secondary storage device. Next, the system performs a checksum write operation to a validation device to update the current checksum value and the old checksum value, and then performs a data write operation to the secondary storage device to write the new data to the block of the secondary storage device.

In one embodiment of the present invention, if the current checksum value is invalid, which indicates that the current checksum value has not been written to, and the old checksum value is similarly invalid, performing the checksum write operation involves updating the current checksum value to be the new checksum value.

In one embodiment of the present invention, if the current checksum value is valid and the old checksum value is invalid, performing the checksum write operation involves updating the old checksum value to be the current checksum value, and updating the current checksum value to be the new checksum value.

In one embodiment of the present invention, if the current checksum value is valid and the old checksum value is valid, performing the checksum write operation involves updating the old checksum value to match data that is presently stored in the block on the secondary storage device, and updating the current checksum value to be the new checksum value.

In a variation on this embodiment, updating the old checksum value to match data that is presently stored in the block involves determining whether the current checksum value or the old checksum value matches data that is presently stored in the block on the secondary storage device. It also involves using the matching value to update the old checksum value.

In one embodiment of the present invention, upon receiving a read request to read a second block of data, the system performs a data read operation to read the second block of data from the secondary storage device. Next, the system calculates a checksum value from the second block of data. The system also performs a checksum read operation to read an existing checksum value for the second block of data from the validation device. The system then compares the calculated checksum value with the existing checksum value and indicates an error condition if the calculated checksum value does not match the existing checksum value.

In one embodiment of the present invention, the secondary storage device is a disk drive.

In one embodiment of the present invention, the validation device is separate from the secondary storage device.

In one embodiment of the present invention, the validation device and the secondary storage device are the same device.

BRIEF DESCRIPTION OF THE FIGURES

FIG. 3 is a flow chart illustrating the process of performing a write operation that involves recording checksum information in accordance with an embodiment of the present invention.

FIG. 4 is a flow chart illustrating the process of performing a read operation that involves verifying checksum information in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
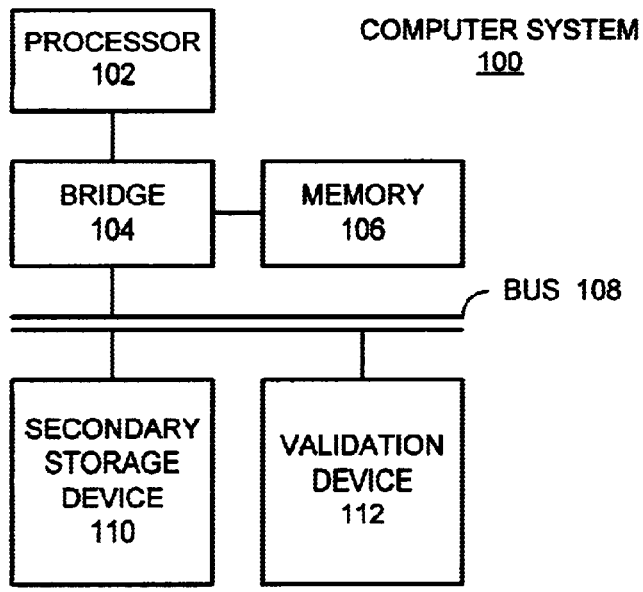
FIG. 1 illustrates a computer system in accordance with an embodiment of the present invention.

FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance.

Computer system 100 includes a processor 102, which is coupled to a random access memory 106 through bridge 104.

Computer system 100 also includes secondary storage device 110 and validation device 112 which are attached to bridge 104 through bus 108. Secondary storage device 110 and validation device 112 are non-volatile storage devices that can include, but are not limited to, systems based upon magnetic, optical, and magneto-optical storage devices, as well as storage devices based on flash memory and/or battery-backed up memory.

In one embodiment of the present invention, secondary storage device 110 and validation device 112 are separate disk drives.

In another embodiment, secondary storage device 110 and validation device 112 are contained within the same disk drive. In this embodiment, some of the disk blocks are dedicated to storing data while other disk blocks are dedicated to storing checksum information.

During a write operation, computer system 100 generally writes a data block to secondary storage device 110, and writes corresponding checksum information to validation device 112. This writing process is described in more detail below with reference to FIG. 3.

During a read operation, computer system 100 generally reads a data block from secondary storage device 110, and reads corresponding checksum information from validation device 112. This reading process is described in more detail below with reference to FIG. 4.

Checksum Values

Figure 2:
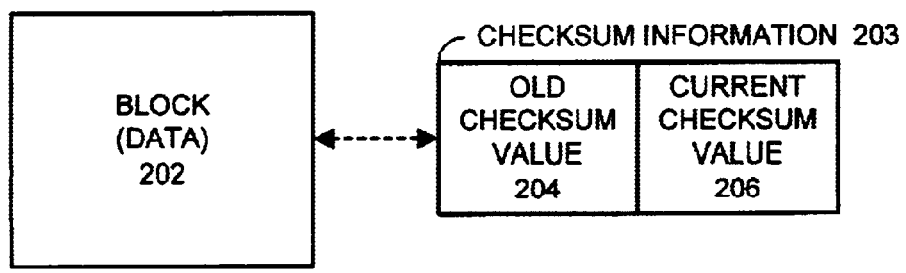
FIG. 2 illustrates how checksum values are associated with a block of data in accordance with an embodiment of the present invention.

FIG. 2 illustrates how checksum values are associated with a block of data 202 in accordance with an embodiment of the present invention. Each block 202 on secondary storage device 110 is associated with checksum information 203. Checksum information 203 includes an old checksum value 204 and a current checksum value 206. Old checksum value 204 generally stores a prior checksum value calculated for prior data that was stored in block 202, whereas current checksum value 206 generally stores a current checksum value for current data that is stored in block 202.

Note that by storing the old checksum value 204 along with the current checksum value 206, if the corresponding write operation of the current data to disk block 202 did not take place, the old checksum value 204 remains valid for the old data in block 202.

Write Operation

FIG. 3 is a flow chart illustrating the process of performing a write operation that involves recording checksum information in accordance with an embodiment of the present invention. The system starts by receiving a write request along with new data to be written to secondary storage device 110 (step 302). Next, the system calculates a new checksum from the new data (step 304). This can involve using any one of a number of well-known checksum algorithms that compute a function of the data so that modifications to the data can be detected with high probability.

The system also retrieves checksum information 203 from validation device 112. This checksum information 203 includes both an old checksum value 204 and a current checksum value 206. The system also retrieves the associated data block 202 if it exists (step 306).

Note that an invalid state for a checksum value can be indicated by a valid bit that is associated with the checksum value. Alternatively, the invalid state can be indicated through a reserved bit pattern for the checksum value, such as a zero value.

Next, if the old checksum value 204 and the current checksum value 206 are both invalid, block 202 has never been written to with an associated checksum. In this case, the system updates the current checksum value 206 to be the new checksum value and leaves the old checksum value 204 in the invalid state (step 308). Note that both checksum values are written back to validation device 112 in a single atomic write operation.

Next, if current checksum value 206 is valid and the old checksum value 204 is invalid, block 202 has only been written to once with an associated checksum. Furthermore, current checksum value 206 is the only checksum value recorded so far. In this case, the system updates old checksum value 204 on validation device 112 with current checksum value 206 and updates current checksum value 206 with the new checksum value (step 310).

Next, if old checksum value 204 and new checksum value 206 are both valid, block 202 has only been written to at least twice with an associated checksum. In this case, the system determines whether the old checksum value 204 or the current checksum value 206 matches the data that is presently stored in block 202. The system updates old checksum value 204 to be the matching value and updates the current checksum value 206 to be the new checksum value. If neither checksum matches the original data, the old checksum value 204 is set to be invalid and the current checksum value 206 is set to match the new data (step 312).

Next, the system writes the new data to block 202 on secondary storage device 110 (step 314).

Note that if the system crashes between steps 312 and 314, the data in block 202 on secondary storage device 110 is consistent with old checksum value 204 instead of current checksum value 206. This is why the system has to determine which checksum value matches the data in step 312.

Read Operation

FIG. 4 is a flow chart illustrating the process of performing a read operation that involves verifying checksum information in accordance with an embodiment of the present invention.

The system starts by receiving a read request to read a block 202 from secondary storage device 110 (step 402). In response to this read request, the system reads a block 202 from secondary storage device 110 (step 404). Next, the system calculates a checksum from the data retrieved from secondary storage device 110 (step 406).

The system also reads an existing checksum for block 202 from validation device 112 (step 408), and compares this existing checksum with the calculated checksum (step 410). If the existing checksum differs from the calculated checksum, the system indicates an error condition.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

For example, caching of checksums and old data may be done to improve performance.

What is claimed is:

1. A method for facilitating validation of data retrieved from a secondary storage device, comprising:
   receiving a write request to write new data to a block of the secondary storage device;
   calculating a new checksum value from the new data;
   retrieving two previously stored checksum values, including a current checksum value and an old checksum value associated with the block of the secondary storage device, wherein the current checksum value relates to data that is supposed to be currently stored in the block and the old checksum value relates to data that was previously stored in the block, and wherein the current checksum value and the old checksum value are used to determine if the data that is supposed to be currently stored in the block device was actually stored;
   performing a checksum write operation to a validation device to write both the current checksum value and the old checksum value to the validation device; and
   performing a data write operation to the secondary storage device to write the new data to the block of the secondary storage device.

2. The method of claim 1, wherein if the current checksum value is invalid, which indicates that the current checksum value has not been written to, and the old checksum value is similarly invalid, performing the checksum write operation involves updating the current checksum value to be the new checksum value.

3. The method of claim 1, wherein if the current checksum value is valid and the old checksum value is invalid, performing the checksum write operation involves updating the old checksum value to be the current checksum value, and updating the current checksum value to be the new checksum value.

4. The method of claim 1, wherein if the current checksum value is valid and the old checksum value is valid, performing the checksum write operation involves updating the old checksum value to match data that is presently stored in the block on the secondary storage device, and updating the current checksum value to be the new checksum value.

5. The method of claim 4, wherein updating the old checksum value to match data that is presently stored in the block involves:
   determining whether the current checksum value or the old checksum value matches data that is presently stored in the block on the secondary storage device; and
   using the matching value to update the old checksum value.

6. The method of claim 1, further comprising:
   receiving a read request to read a second block of data from the secondary storage device;
   performing a data read operation to read the second block of data from the secondary storage device;
   calculating a checksum value from the second block of data;
   performing a checksum read operation to read an existing checksum value for the second block of data from the validation device;
   comparing the calculated checksum value with the existing checksum value; and
   indicating an error condition if the calculated checksum value does not match the existing checksum value.

7. The method of claim 1, wherein the secondary storage device is a disk drive.

8. The method of claim 1, wherein the validation device is separate from the secondary storage device.

9. The method of claim 1, wherein the validation device and the secondary storage device are the same device.

10. A method for facilitating validation of data retrieved from a disk, comprising:
   receiving a write request to write new data to a block of the disk;
   calculating a new checksum value from the new data;
   retrieving two previously stored checksum values, including a current checksum value and an old checksum value associated with the block of the disk, wherein the current checksum value relates to data that is supposed to be currently stored in the block and the old checksum value relates to data that was previously stored in the block, and wherein the current checksum value and the old checksum value are used to determine if the data that is supposed to be currently stored in the block device was actually stored;
   performing a checksum write operation to a validation device to write both the current checksum value and the old checksum value to the validation device;
   wherein if the current checksum value is invalid, which indicates that the current checksum value has not been written to, and the old checksum value is similarly invalid, performing the checksum write operation involves updating the current checksum value to be the new checksum value;
   wherein if the current checksum value is valid and the old checksum value is invalid, performing the checksum write operation involves updating the old checksum value to be the current checksum value, and updating the current checksum value to be the new checksum value;
   wherein if the current checksum value is valid and the old checksum value is valid, performing the checksum write operation involves updating the old checksum value to match data that is presently stored in the block on the disk, and updating the current checksum value to be the new checksum value; and performing a data write operation to the disk to write the new data to the block of the disk.

11. A computer-readable storage medium storing instructions that when executed by a computer cause the computer to perform a method for facilitating validation of data retrieved from a secondary storage device, the method comprising:

receiving a write request to write new data to a block of the secondary storage device;

calculating a new checksum value from the new data;

retrieving two previously stored checksum values, including a current checksum value and an old checksum value associated with the block of the secondary storage device, wherein the current checksum value relates to data that is supposed to be currently stored in the block and the old checksum value relates to data that was previously stored in the block, and wherein the current checksum value and the old checksum value are used to determine if the data that is supposed to be currently stored in the block device was actually stored;

performing a checksum write operation to a validation device to write both the current checksum value and the old checksum value to the validation device; and performing a data write operation to the secondary storage device to write the new data to the block of the secondary storage device.

12. The computer-readable storage medium of claim 11, wherein if the current checksum value is invalid, which indicates that the current checksum value has not been written to, and the old checksum value is similarly invalid, performing the checksum write operation involves updating the current checksum value to be the new checksum value.

13. The computer-readable storage medium of claim 11, wherein if the current checksum value is valid and the old checksum value is invalid, performing the checksum write operation involves updating the old checksum value to be the current checksum value and updating the current checksum value to be the new checksum value.

14. The computer-readable storage medium of claim 11, wherein if the current checksum value is valid and the old checksum value is valid, performing the checksum write operation involves updating the old checksum value to match data that is presently stored in the block on the secondary storage device, and updating the current checksum value to be the new checksum value.

15. The computer-readable storage medium of claim 14, wherein updating the old checksum value to match data that is presently stored in the block involves:

determining whether the current checksum value or the old checksum value matches data that is presently stored in the block on the secondary storage device; and using the matching value to update the old checksum value.

16. The computer-readable storage medium of claim 11, wherein the method further comprises:

receiving a read request to read a second block of data from the secondary storage device;

performing a data read operation to read the second block of data from the secondary storage device;

calculating a checksum value from the second block of data;

performing a checksum read operation to read an existing checksum value for the second block of data from the validation device;

comparing the calculated checksum value with the existing checksum value; and indicating an error condition if the calculated checksum value does not match the existing checksum value.

17. The computer-readable storage medium of claim 11, wherein the secondary storage device is a disk drive.

18. The computer-readable storage medium of claim 11, wherein the validation device is separate from the secondary storage device.

19. The computer-readable storage medium of claim 11, wherein the validation device and the secondary storage device are the same device.

20. An apparatus that facilitates validation of data retrieved from a secondary storage device, comprising:

a receiving mechanism that is configured to receive a write request to write new data to a block of the secondary storage device;

a checksum mechanism that is configured to calculate a new checksum value from the new data;

a retrieving mechanism that is configured to retrieve two previously stored checksum values, including a current checksum value and an old checksum value associated with the block of the secondary storage device, wherein the current checksum value relates to data that is supposed to be currently stored in the block and the old checksum value relates to data that was previously stored in the block, and wherein the current checksum value and the old checksum value are used to determine if the data that is supposed to be currently stored in the block device was actually stored;

a checksum writing mechanism that is configured to perform a checksum write operation to a validation device to write both the current checksum value and the old checksum value to the validation device; and a data writing mechanism that is configured to perform a data write operation to the secondary storage device to write the new data to the block of the secondary storage device.

21. The apparatus of claim 20, wherein if the current checksum value is invalid, which indicates that the current checksum value has not been written to, and the old checksum value is similarly invalid, the checksum writing mechanism is configured to update the current checksum value to be the new checksum value.

22. The apparatus of claim 20, wherein if the current checksum value is valid and the old checksum value is invalid, the checksum writing mechanism is configured to update the old checksum value to be the current checksum value and to update the current checksum value to be the new checksum value.

23. The apparatus of claim 20, wherein if the current checksum value is valid and the old checksum value is valid, the checksum writing mechanism is configured to update the old checksum value to match data that is presently stored in the block on the secondary storage device, and to update the current checksum value to be the new checksum value.

24. The apparatus of claim 23, wherein while updating the old checksum value to match data that is presently stored in the block, the checksum writing mechanism is configured to:

determine whether the current checksum value or the old checksum value matches data that is presently stored in the block on the secondary storage device; and to use the matching value to update the old checksum value.

25. The apparatus of claim 20, wherein the receiving mechanism is configured to receive a read request to read a second block of data from the secondary storage device;

a data reading mechanism that is configured to perform a data read operation to read the second block of data from the secondary storage device;

wherein the checksum mechanism is configured to calculate a checksum value from the second block of data;

a checksum reading mechanism that is configured to perform a checksum read operation to read an existing checksum value for the second block of data from the validation device; and a validation mechanism that is configured to,
   compare the calculated checksum value with the existing checksum value, and to
   indicate an error condition if the calculated checksum value does not match the existing checksum value.

26. The apparatus of claim 20, wherein the secondary storage device is a disk drive.

27. The apparatus of claim 20, wherein the validation device is separate from the secondary storage device.

28. The apparatus of claim 20, wherein the validation device and the secondary storage device are the same device.

* * * * *